(12) United States Patent
Doty

(10) Patent No.: US 6,637,077 B2
(45) Date of Patent: Oct. 28, 2003

(54) ADJUSTABLE STRAP

(76) Inventor: Douglas H Doty, 9121 E. Aqua Vista Dr., Inverness, FL (US) 34450

( * ) Notice: Subject to any disclaimer, the term of this patent is extended or adjusted under 35 U.S.C. 154(b) by 0 days.

(21) Appl. No.: 09/990,228

(22) Filed: Nov. 21, 2001

(65) Prior Publication Data

US 2003/0093884 A1 May 22, 2003

(51) Int. Cl.[7] ............................................. A44B 21/00
(52) U.S. Cl. ........................ 24/302; 24/298; 24/68 CD; 24/68 R
(58) Field of Search .................... 114/267, 230.2–230.3; 244/115, 116; 441/3–5; 410/101; 24/68 R, 69 R, 70 CT, 70 ST, 69 CT, 69 CF, 71 R, 71 ST, 71 TD, 71 CD, 68 CD, 71.1, 298–307, 163 R, 164, 165, 168, 170, 182, 191–193, 197; 224/257, 258, 400, 406, 493, 500, 501, 600, 511–514, 601; 119/96, 106, 109, 792, 795, 797, 770, 793, 798

(56) References Cited

U.S. PATENT DOCUMENTS

| | | | | |
|---|---|---|---|---|
| 3,377,007 A | * | 4/1968 | Gayler, Jr. ................... 224/609 |
| 3,718,947 A | * | 3/1973 | Huber .......................... 24/298 |
| 4,593,599 A | * | 6/1986 | Yeardley .......................... 87/6 |
| 4,751,896 A | * | 6/1988 | Miley ........................... 119/96 |
| 4,823,443 A | | 4/1989 | Waters ..................... 24/68 CD |
| 5,018,775 A | * | 5/1991 | McKenna et al. ............. 294/74 |
| 5,040,324 A | * | 8/1991 | Rivera et al. .................. 43/26 |
| 5,063,641 A | | 11/1991 | Chuan ......................... 24/197 |
| 5,103,536 A | | 4/1992 | Kamper .................... 24/68 CD |
| 5,193,955 A | | 3/1993 | Chou .......................... 410/100 |
| 5,353,538 A | * | 10/1994 | Hakedal et al. ................ 42/85 |
| 5,370,286 A | * | 12/1994 | Newman ..................... 224/578 |
| 5,423,644 A | | 6/1995 | First, Sr. ..................... 410/100 |
| 5,437,401 A | * | 8/1995 | Seltzer ........................ 224/578 |
| 5,551,447 A | * | 9/1996 | Hoffman et al. ............. 128/869 |
| 5,584,622 A | | 12/1996 | Dickerson, Sr. .............. 410/21 |
| 5,603,545 A | * | 2/1997 | Benson et al. ............... 294/150 |
| 5,695,101 A | * | 12/1997 | Frietze ........................ 224/250 |
| 5,709,172 A | * | 1/1998 | Maglich ...................... 119/797 |
| 5,762,242 A | * | 6/1998 | Yost ............................ 224/250 |
| 5,810,219 A | * | 9/1998 | Rosenfield ................... 224/150 |
| 5,941,665 A | | 8/1999 | Dahlin ......................... 410/20 |
| 5,941,666 A | | 8/1999 | Waters ........................ 410/100 |
| 6,068,167 A | * | 5/2000 | Hopson ........................ 224/150 |
| 6,192,554 B1 | | 2/2001 | Dumcum ................... 24/16 PB |
| 6,195,848 B1 | | 3/2001 | Jackson et al. ........... 24/68 CD |
| 6,360,747 B1 | * | 3/2002 | Velarde et al. .............. 128/869 |
| 6,371,346 B1 | * | 4/2002 | Sharma ....................... 224/578 |
| 6,508,389 B1 | * | 1/2003 | Ripoyla et al. .............. 224/157 |

FOREIGN PATENT DOCUMENTS

| | | | |
|---|---|---|---|
| GB | 2061436 | | 5/1981 |
| GB | 2328919 | | 2/1998 |
| JP | 2000009189 | * | 1/2000 |

* cited by examiner

*Primary Examiner*—James R. Brittain
*Assistant Examiner*—Ruth C. Rodriguez
(74) *Attorney, Agent, or Firm*—Michael I. Kroll

(57) ABSTRACT

An adjustable strap is provided having two loops of different lengths at each end, and a tensioning mechanism on the strap for adjusting the length and tension of the overall strap. S-hooks are placed on each of the short loops with an open but closable receiving hook positioned to hook the longer loop when the latter is routed back to the short loop. For dock and boat cleats having two legs and an opening, the long loop is adapted such that it can loop the cleat generally and then have the loop end threaded through the cleat on return to the short loop where it is hooked. A closed-biased member on the S-hook can be manipulated to allow later detachment. The short and long loops are configured to lie in parallel planes such that the strap may be used in a single loop configuration and have a flat side profile.

18 Claims, 12 Drawing Sheets

ADJUSTABLE STRAP

BACKGROUND OF THE INVENTION

1. Field of the Invention

The present invention relates generally to tie-down straps, and more specifically, to an adjustable tie-down apparatus having two strap members with double loops on each end and a tensioning mechanism for securing boats, motorcycles, aircraft and other objects during storage or transport.

2. Description of the Prior Art

There are other strap tie-down devices. Typical of these is U.S. Pat. No. 4,823,443 issued to Veldon Waters on Apr. 25, 1989 and U.S. Pat. No. 5,063,641 issued on Nov. 12, 1991 to Chiang C. Chuan.

Another patent was issued to Hans-Werner Kamper on Apr. 14, 1992 as U.S. Pat. No. 5,103,536. Yet another U.S. Pat. No. 5,193,955 was issued to An-Chuan Chou on Mar. 16, 1993 and still yet another was issued to Donald L. Dickerson Sr. on Dec. 17, 1996 as U.S. Pat. No. 5,584,622.

Another patent was issued to Frederick R. Dahlin on Aug. 24, 1999 as U.S. Pat. No. 5,941,665. Yet another U.S. Pat. No. 5,941,666 was issued to Donald R. Waters on Aug. 24, 1999. Another was issued to Russell L. Dumcum on Feb. 27, 2001 as U.S. Pat. No. 6,192,554 B1 and still yet another was issued on Mar. 6, 2001 to Stephen D. Jackson et al. as U.S. Pat. No. 6,195,848 B1.

A patent was issued on Jun. 11, 1980 to Nissim Alfassa as U.K. Patent Application GB 2 061 436 A and on Oct. 3, 1999 U.K. Patent Application GB 2 328 919 A was issued to William James Millar Robb.

Another patent was issued to Richard C. First on Jun. 13, 1995 as U.S. Pat. No. 5,423,644.

U.S. Pat. No. 4,823,443

Inventor: Veldon Waters

Issued: Apr. 25, 1989

A strap tie down device combining the winch-pulley effect comprising an elongated rigid frame made up of a base and two spaced parallel side plates attached perpendicular to opposite sides of said base, at both ends of the frame a set of at least two transverse extending connecting rods joined to both sides of the plate members, the connecting rods being separated from each other by sufficient distance to permit a looping of the strap between the rods, the loops are capable of being held in place by adding a removable rod under the loop, and a winch-type strap tightening apparatus attached to the side plate members between the inner connecting rods at both ends of the frame, and a device for rotating the winch-type strap tightening apparatus so as to tighten any strap placed in the strap adjusting device, and a device for holding the tightening apparatus to prevent unwinding.

U.S. Pat. No. 5,063,641

Inventor: Chiang C. Chuan

Issued: Nov. 12, 1991

A buckle for locking straps used for fastening goods includes a belt having two loop ends each enclosing a pair of rectangular lower and upper rings and a rectangular loosening ring with a flat side. A strap winds each pair of rings. One of said straps encloses the rectangular loosening ring such that it is locked when the loosening ring is in a horizontal position, and is allowed to slacken when said loosening ring is in a vertical position.

U.S. Pat. No. 5,103,536

Inventor: Hans Werner Kamper

Issued: Apr. 14, 1992

A tensioning assembly for the stepwise tightening and releasing of a tensioning strap includes a frame, a tensioning lever, and a wind-up spindle supporting ratchet wheels. A driving pawl which is movably mounted on the tensioning lever serves to rotate the wind-up spindle when the strap is being tightened. Reverse rotation of the wind-up spindle is prevented by a pair of locking pawls which are movably mounted on the frame. The lower or bearing end of the tensioning lever has an unlatching cam which permits the locking pawls to be alternatingly moved out of engagement with the teeth of the ratchet wheels, thus promoting safety by relieving the strap tension in stages. An isolating cam at the bearing end of the tensioning lever permits both locking pawls to be disengaged after the strap tension has been reduced.

U.S. Pat. No. 5,193,955

Inventor: An-Chuan Chou

Issued: Mar. 16, 1993

A cargo binding device includes a net member, a plurality of intermediate cargo strap members, and a plurality of strap tensioners. The net member is formed of a plurality of longitudinally and transversely extending and intersecting cargo straps whose intersection areas are secured each to the other. Each end portion of the individual longitudinally and transversely extending cargo straps of the net member is formed into a loop. Each strap tensioner includes a spring-loaded push plate member. The push plate member is provided with a plurality of teeth for grippingly engaging an intermediate cargo strap member.

U.S. Pat. No. 5,423,644

Inventor: Richard C. First Sr.

Issued: Jun. 13, 1995

A cargo tie-down device in one embodiment includes hooks and/or loops for connection to the vehicle, a buckle assembly comprising a pair of buckles, and straps which extend through the buckles and interconnect the hooks and/or loops. The straps extend a plurality of times between the buckles to provide a mechanical advantage for the tie-down device. Loops or handles on the straps allow the user to easily pull a take-up strap to initially take in the slack in the strap, and then to pull a winch strap to tightly secure the tie-down device over the load. Releasable cam locking mechanisms on the buckles normally engage the straps during the tightening process, but can be manually manipulated to release the straps to remove the tie-down device from the vehicle. In a second embodiment, the tie-down device comprises a pair of hooks for connection to the vehicle, a single buckle, and a strap which extends through the buckle and interconnects the hooks. The strap again extends a plurality of times between the buckle and one hook to provide a mechanical advantage. The buckle in the second embodiment also includes a releasable cam locking mechanism which normally engages the strap but can be manually manipulated out of engagement with the strap.

U.S. Pat. No. 5,584,622

Inventor: Donald L. Dickerson

Issued: Dec. 17, 1996

A tie down device for securing an automotive vehicle by its wheels and tires into a transport vehicle, is described. The tie down device includes a first strap and a second strap with the second strap connected at its first end to the first strap near the first end of the first strap. The first end of the first strap has a first loop which forms the first end of the device. The second end of the second strap has a second loop which forms the intermediate end of the device. To configure the device, the second end of the device is passed first through the second loop and then through the first loop. The device is then positioned on the tire such that the second strap extends over the top of the tire on the wheel and the first strap extends around the tire. The second end of the device is wrapped around the spool of a ratchet which is part of a securing mechanism which connects the device to the bed of the transport vehicle. The first strap is able to slide within the loops in order to allow the device to adjust to any size wheel for better fit during tensioning.

U.S. Pat. No. 5,941,665

Inventor: Frederick R. Dahlin

Issued: Aug. 24, 1999

A hold down system for securing a vehicle to a transporter includes at least one hold down device for each wheel of the vehicle. The hold down device includes a short strap having two end loops and a long strap. The extremities of the long strap pass through the end loops of the short and the ends of the long strap are attached and tightened to the transporter so that the harness loop formed by the central portion of the long strap and the short strap encircles a portion of the wheel and secures such to the transporter. Each wheel of the vehicle may be individually secured to the transporter to stably maintain the position of the vehicle on the transporter while it is in transit.

U.S. Pat. No. 5,941,666

Inventor: Donald R. Waters

Issued: Aug. 24, 1999

A tie-down device to hold tractor trailer dunnage securely to the landing gear of a trailer when the dunnage is not in use. The tie-down device includes a pawl and ratchet winding mechanism having a securement strap which wraps around the dunnage and hooks to an eye hook which is resiliently mounted to a support member to maintain tension upon the securement strap.

U.S. Pat. No. 6,192,554 B1

Inventor: Russell L. Duncum

Issued: Feb. 27, 2001

An adjustable, flexible tie strap with low insertion and release forces but which provides significantly greater holding force. A tapered head has rearwardly extending ears which engage the body of the strap to prevent withdrawal after the head is passed through a retaining hole in the strap. The design of the ears is such that the lock, or brace, against each other in response to tension on the strap, reducing distortion of the head and increasing the holding power. The strap may also have a tab for attachment to a cord or rope.

U.S. Pat. No. 6,195,848

Inventor: Stephen D. Jackson et al.

Issued: Mar. 6, 2001

A strap tensioning device that uses ratchet means to wind up and secure a tension strap in a tensioned condition for securing loads for hauling or transport. The device is adapted to be moveable along the length of a tension strap prior to tensioning the strap and includes a slotted member having a guide slot through which the strap is threaded for facilitating movement of the device along the strap and to prevent the device from cocking or twisting away from the device when the device is actuated to tension the strap. A slidable hook for a tensioning strap is also provided for use with the tensioning device. The hook includes a guide clip that provides for a receiving slot through which the strap is also threaded. The receiving slot maintains the strap in alignment with the guide slot.

U.K. Patent Application GB 2 061 436 A

Inventor: Nissim Alfassa

Issued: May 13, 1981

A buckle has a body portion and a pivotally attached lever plate portion, the body having a striker plate and a first latch portion attached thereto and the lever plate having a corresponding second latch portion such that the latch portions interengage on closing the buckle with the plate engaging over the portion to secure the buckle and disengagement being effected on pressure being applied to the striker plate. Improperly latched buckles are caused to latch fully by tension on the cargo straps by virtue of their passage over the cross member.

U.K. Patent Application GB 2 328 919 A

Inventor: William James Millar Robb

Issued: Oct. 3, 1999

A cargo strap coiler comprises a hub onto which an elongate flexible member, e.g. a vehicle cargo strap, is coiled, a base which remains stationary during coiling and a rotating member which rotates relative to the base about the axis of the hub to facilitate coiling. Preferably the base and the rotating member both comprise a substantially rectangular member and are removably connected together via cooperating cylindrical stubs forming the hub when connected, located towards one end of the rectangular members. Preferably the rotating member has a retaining means, e.g. a rod parallel to the hub axis located adjacent to the hub, for securing one end of the elongate flexible member. The device may be manually operated via a handle on the rotating member, or be provided with a powered driving means, e.g. an electric motor. Preferably a U-shaped guide means is provided on the base at an opposite end to the stub, and the base may be provided with a handle or alternatively be mountable on a vehicle, e.g. by magnetic means.

While these tie down devices may be suitable for the purposes for which they were designed, they would not be as suitable for the purposes of the present invention, as hereinafter described. For example, none allow an attachment to a typical dock cleat having two legs and a cross member forming a cleat opening, where a first loop can be draped about the cleat generally and then its end be routed through the opening as the first loop is routed back to the first loop to be attached to the first loop using a fastening member such as an S-hook.

SUMMARY OF THE PRESENT INVENTION

A primary object of this invention is to provide a tensionable tie-down strap that allows an attachment to a typical dock cleat having two legs and a cross member forming a cleat opening, where a first loop can be draped about the cleat generally and then its end be routed through the opening as the first loop is routed back to the $2^{nd}$ loop to be attached to the $2^{nd}$ loop using a clasping member such as an S-hook.

Another object of the present invention is to provide a tensionable tie-down strap that offers the user a plurality of options for securing an object to another for storage or transport.

An additional object of the present invention is to provide a tensionable tie-down strap that can quickly secure a boat in a dock slip in a manner that will allow the user to attach one end of the strap to a boat cleat and the other end to a dock cleat without tying a knot.

A further object of the present invention is to provide a tensionable tie-down strap with elongated loops on the distal ends that can secure motorcycles to trailers, beds of pick-up trucks and other such surfaces without the hooks making contact with the motorcycle and possibly scratching and marring the components thereof.

A yet further object of the present invention is to provide a tensionable tie-down strap wherein the tensioning mechanism could be a cam-type ratchet buckle, a compression buckle or any other mechanism that would serve the purpose of connecting and tightening the two cooperating strap members.

A still further object of the present invention is to provide a tensionable tie-down strap with a clasping element joining double loops of different lengths, wherein the clasping element could include S-hooks, spring loaded locking clamps or any other applicable clasping device.

One more object of the present invention is to provide a tensionable tie-down strap that is simple and easy to use.

A further object of the present invention is to provide a tensionable tie-down strap that is economical in cost to manufacture.

Further objects of the present invention will appear as the description proceeds.

A tie down apparatus is provided that has two strap portions, each with an end having double loops of unequal length and a clasping member for joining the two loops after the longer loop is routed to, and back from, an object. A tensioning mechanism is used to adjust the length and tension of the strap as it is being used for securing boats, motorcycles, aircraft and other objects during storage or transport.

An apparatus is provided for affixing a first object to a second object, the first object having a fastening receptacle and the second object having a fastening receptacle, comprising: an elongated strap having a first portion and a second portion; a length adjustment member, the first strap portion and the second strap portion extending from the length adjustment member, for alternately shortening and lengthening the combined length of the first and second strap portions; the first strap portion further having a first loop and an elongated, longer second loop extending from the first strap portion and beyond the first loop, the extent to which the second loop extends beyond the first loop being large enough such that the elongated second loop can be routed to encompass the first object fastening receptacle and then routed back to the first loop; a fastening member for securing the first loop to the second loop when the second loop is routed back to the first loop from the first object fastening receptacle; and the second strap portion having a distal portion, the distal portion being attachable to the second object fastening receptacle.

In another embodiment, the second strap portion distal portion is a loop, the second strap portion further having an elongated, longer second loop extending from the second strap portion and beyond the second strap portion distal loop, the extent to which the second loop extends beyond the distal loop being large enough such that the elongated second loop can be routed to encompass the second object fastening receptacle and then routed back to the distal loop, the apparatus further comprising a second fastening member for securing the distal loop to the second strap portion second loop when the second loop is routed back to the distal loop from the second object fastening receptacle.

In another embodiment, the second fastening member has a first closing hook for hooking and closing about the second strap portion distal loop, and a second closing hook for hooking and closing about the second strap portion second loop.

In another embodiment, the first object fastening receptacle is a cleat having two legs, a cross piece joining the two legs and, with the first object, forming a cleat opening between the legs, and further wherein the second loop has a distal end and a length such that the second loop can be placed to loop the two cleat legs and the second loop distal end can then be drawn through the cleat opening as the second loop distal end is routed back to the first loop, wherein it is fastenable to the first loop using the fastening member.

In another embodiment, the second object fastening receptacle is a cleat having two legs, a cross piece joining the two legs and, with the second object, forming a cleat opening between the legs, and further wherein the second strap portion second loop has a distal end and a length such that the second loop can be placed to loop the two cleat legs and the second loop distal end can then be drawn through the cleat opening as the second loop distal end is routed back to the second strap portion distal loop, wherein it is fastenable to the distal loop using the second fastening member.

In another embodiment, the fastening member has a first closing hook for hooking and closing about the first loop, and a second closing hook for hooking and closing about the second loop.

In another embodiment, the length adjustment member is ratchetable.

In another embodiment, the apparatus further comprises a flotation member, the flotation member being sized such that the apparatus will float.

In another embodiment, the flotation member is attached to the second strap portion.

In another embodiment, the flotation member is attachable to either the first or second strap portions.

In another embodiment, the length adjustment member is a compression buckle attached to the second strap member, the first strap portion adjustably extending through the compression buckle.

In another embodiment, the fastening member is an S-hook.

In another embodiment, the second fastening member is an S-hook.

In another embodiment, the first and second strap portions are separate portions joined by the length adjustment member.

An apparatus is provided in one embodiment for affixing a first object to a second object, the first object having a fastening receptacle and the second object having a fastening receptacle, comprising: an elongated strap having a first portion and a second portion; length adjusting means for adjusting the combined length of the first strap portion and the second strap portion, said portions extending from the length adjustment means; the first strap portion further having a first loop and an elongated, longer second loop extending from the first strap portion and beyond the first loop, the extent to which the second loop extends beyond the first loop being large enough such that the elongated second loop can be routed to encompass the first object fastening receptacle and then routed back to the first loop; fastening means for securing the first loop to the second loop when the second loop is routed back to the first loop from the first object fastening receptacle; and the second strap portion having a distal portion, the distal portion being attachable to the second object fastening receptacle.

In one embodiment, an apparatus is provided for affixing a first object to a second object, the first object having a fastening receptacle and the second object having a fastening receptacle, comprising: an elongated strap having a first portion and a second portion; a length adjustment member, the first strap portion and the second strap portion extending from the length adjustment member, for alternately shortening and lengthening the combined length of the first and second strap portions; the first strap portion further having a first loop and an elongated, longer second loop extending from the first strap portion and beyond the first loop, the extent to which the second loop extends beyond the first loop being large enough such that the elongated second loop can be routed to encompass the first object fastening receptacle and then routed back to the first loop; a fastening member for securing the first loop to the second loop when the second loop is routed back to the first loop from the first object fastening receptacle; and the second strap portion having a first loop and an elongated, longer second loop extending from the second strap portion and beyond the second strap portion first loop, the extent to which the second loop extends beyond the first loop being large enough such that the elongated second loop can be routed to encompass the second object fastening receptacle and then routed back to the first loop, the apparatus further comprising a second fastening member for securing the first loop to the second strap portion second loop when the second loop is routed back to the first loop from the second object fastening receptacle.

In another embodiment, the first object fastening receptacle is a cleat having two legs, a cross piece joining the two legs and, with the first object, forming a cleat opening between the legs, and further wherein the second loop has a distal end and a length such that the second loop can be placed to loop the two cleat legs and the second loop distal end can then be drawn through the cleat opening as the second loop distal end is routed back to the first loop, wherein it is fastenable to the first loop using the fastening member.

In another embodiment, the second object fastening receptacle is a cleat having two legs, a cross piece joining the two legs and, with the second object, forming a cleat opening between the legs, and further wherein the second strap portion second loop has a distal end and a length such that the second loop can be placed to loop the two cleat legs and the second loop distal end can then be drawn through the cleat opening as the second loop distal end is routed back to the second strap portion first loop, wherein it is fastenable to the first loop using the second fastening member.

To the accomplishment of the above and related objects, this invention may be embodied in the form illustrated in the accompanying drawings, attention being called to the fact, however, that the drawings are illustrative only, and that changes may be made in the specific construction illustrated and described in the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Figure 1:
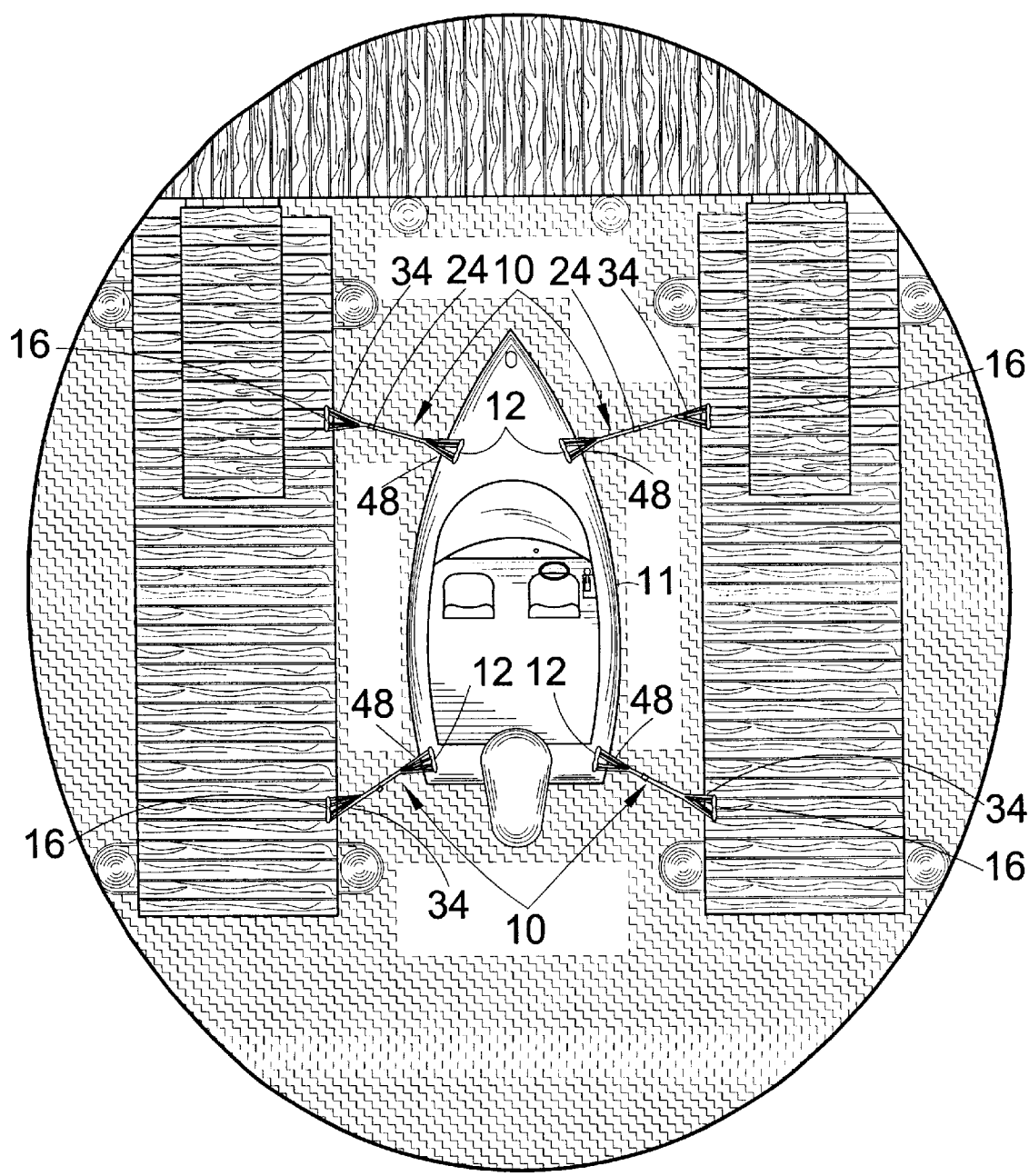
FIG. 1 is a perspective view of the present invention holding a boat secure in its dock slip by placing the elongated loop attachment members over the arms of standard dock and boat cleats and then pulling the loop ends through the cleat legs and securing it with the clasping element to the shorter loop.

Turning now descriptively to the drawings, in which similar reference characters denote similar elements throughout the several views, the figures illustrate the Adjustable Strap of the present invention. With regard to the reference numerals used, the following numbering is used throughout the various drawing figures.

10 Adjustable Strap of the present invention
11 boat
12 boat cleats
14 dock
16 dock cleats
17 dock cleat legs
18 dock cleat cross-member
19 dock cleat opening
20 strap first portion
22 strap second portion
24 ratcheting tensioning mechanism
25 tensioning mechanism lever
26 first strap portion short loop
28 first S-hook
30 first S-hook receiving hook
32 first S-hook receiving hook closure member
34 first strap portion long loop
36 first strap portion long loop end
40 second strap portion short loop
42 second S-hook
44 second S-hook receiving hook
46 second S-hook receiving hook closure member
48 second strap portion long loop
50 second strap portion long loop end
60 motorcycle
62 motorcycle handlebar
64 motorcycle frame member
66 trailer structure
70 flotation member
72 compression buckle
74 compression buckle handle
80 boat tie rings
90 aircraft
92 aircraft tie ring
94 ground surface
96 ground surface tie ring

DETAILED DESCRIPTION OF THE PREFERRED EMBODIMENT

The following discussion describes in detail various embodiments of the invention. This discussion should not be construed, however, as limiting the invention to those particular embodiments. Practitioners skilled in the art will recognize numerous other embodiments as well. For a definition of the complete scope of the invention, the reader is directed to the appended claims.

Figure 2:
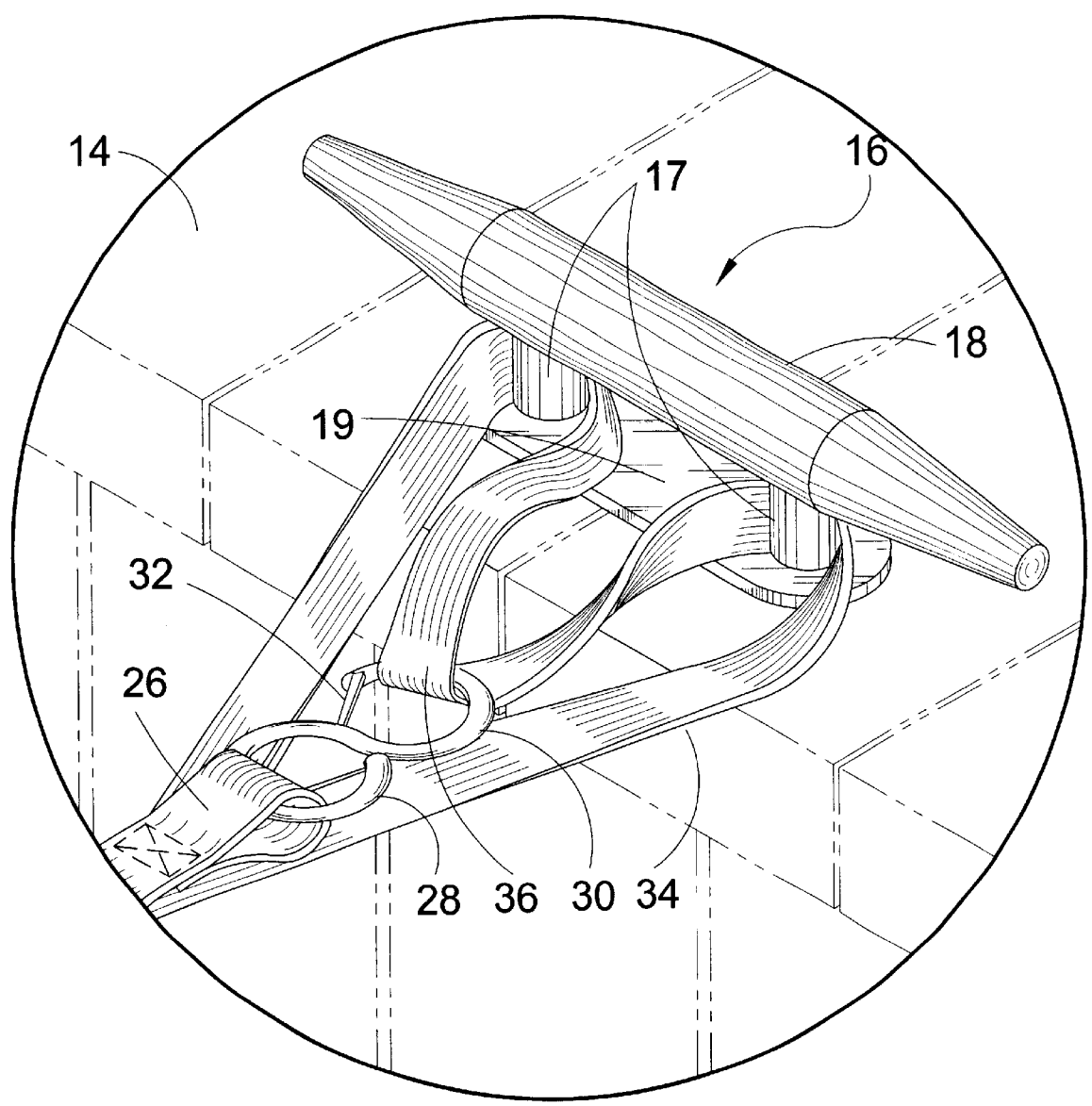
FIG. 2 is a perspective view of the present invention secured to a dock cleat as described above

FIGS. 1–12 depict various embodiments and usages of the Adjustable Strap 10 of the present invention. The strap 10 is shown in use in FIGS. 1–2, 6–7, 11–12. FIGS. 1–2 show the strap 10 being used to secure a boat 11, having boat cleats 12, within a dock slip 14 having dock cleats 16, the dock cleats 16 having legs 17 extending from the dock 14 and a cross-member 18 attached to the legs 17 to form an opening 19.

Figure 3:
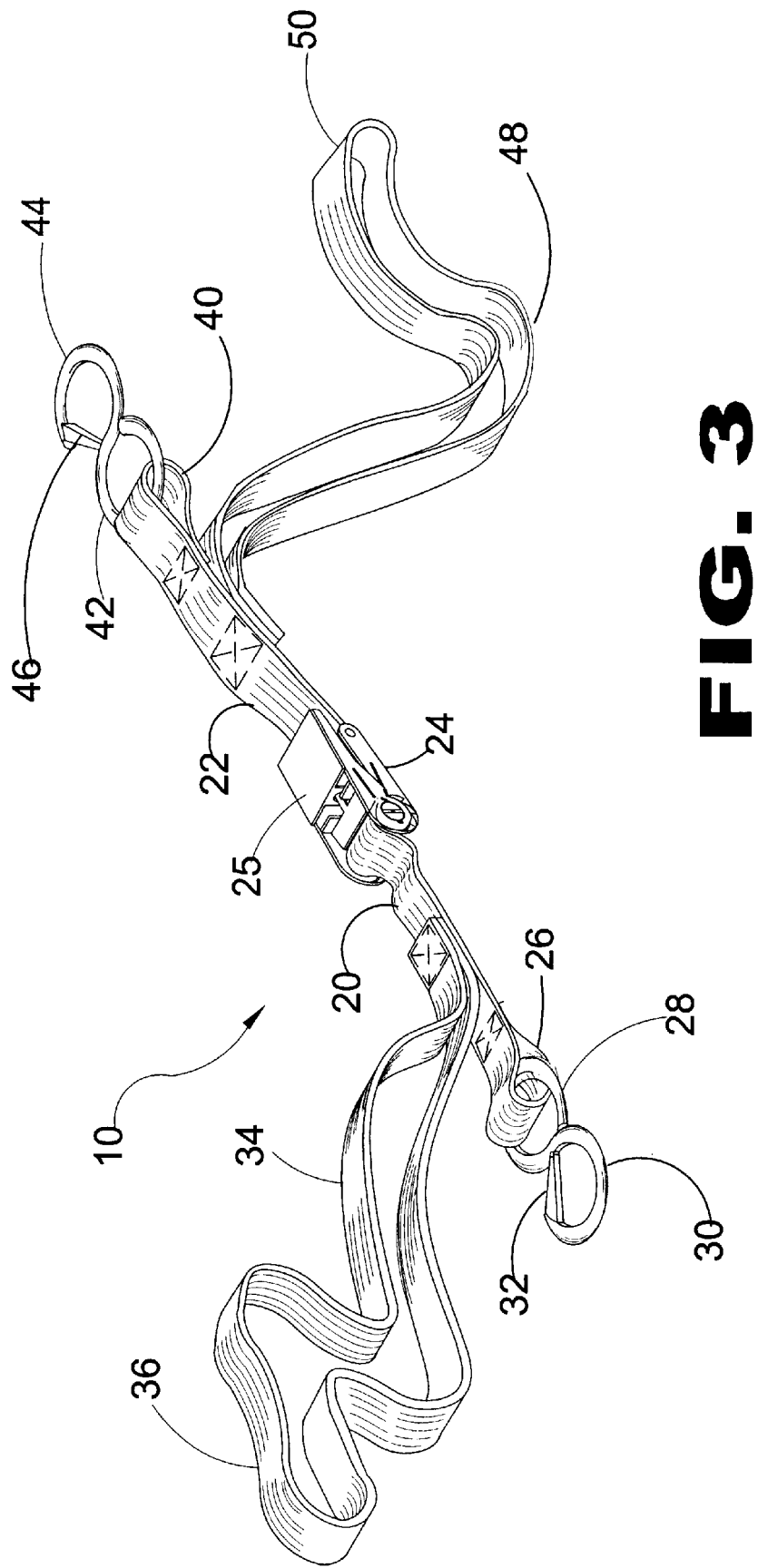
FIG. 3 is a perspective view of the present invention with a ratchet-style tensioning mechanism and spring-loaded locking S-hooks.
Figure 4:
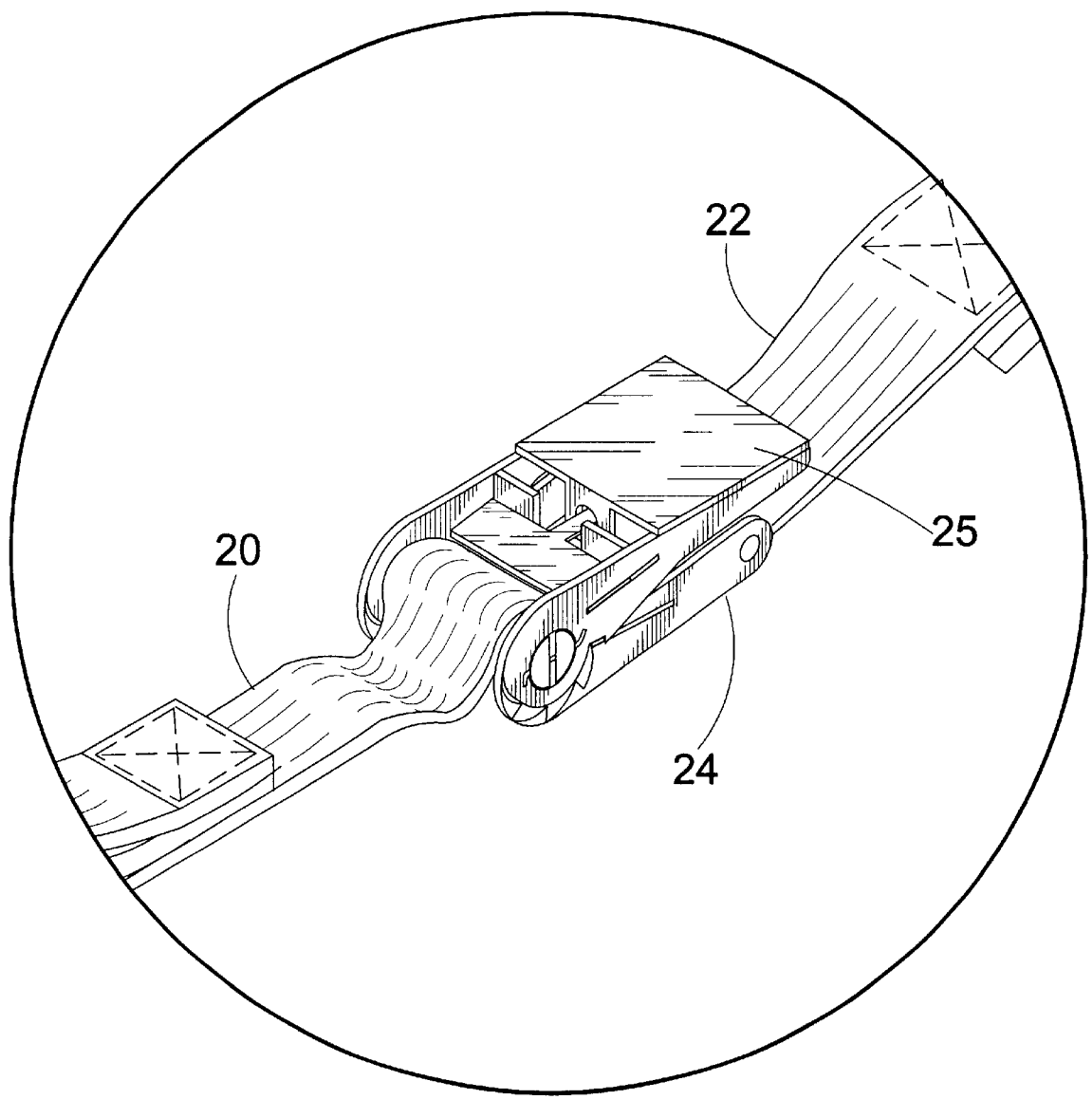
FIG. 4 is an enlarged perspective view of the ratcheting tensioning mechanism of the present invention. This buckle is a preferred tensioning means for the present invention although other such devices may also be applied.

As shown in FIG. 3, the strap 10 has a first strap portion 20 and a second strap portion 22 extending from a ratchet-type tensioning mechanism 24. When the tensioning mechanism lever 25 is ratcheted the strap first portion 20 is spooled onto the mechanism, thus adjusting the length and eventually tensioning the strap 10.

The first strap portion 20 terminates with an abbreviated short loop 26 to which an S-hook 28 is attached and adapted to be non-removable. The free end of the S-hook 28 is a receiving hook 30 having an opening for repeated attachment and detachment. A closing member 32 closes the opening on the receiving hook 30 to prevent unintended detachment. The closing member 32 can be a resilient material or a spring-loaded member biased toward closure.

Attached to the first strap portion 20 between the short loop 26 and the tensioning mechanism 24 is an elongated loop 34 that exceeds the length of the short loop 26 several times over. When stretched such that the elongated loop 34 is flattened and extended to its maximum length, the elongated loop 34 has an end 36.

In the preferred embodiment, the S-hook 28 serves as the member for clasping the returning elongated member end 36. In other embodiments, spring loaded locking clamps or any other applicable clasping device could be used.

In the preferred embodiment, the strap second portion 22 has a correspondingly positioned and sized short loop 40, S-hook 42, S-hook receiving hook 44, closure member 46, elongated loop 48, and elongated loop end 50. In other embodiments, conventional tie-strap ends can be substituted on the second strap portion 22.

As shown in FIG. 2, the length of the elongated loop 34 enables a unique and optimally secured means for attachment to the dock cleat 16 or other similar cleats having a similar opening. In using the special double loop strap 10 of the present invention, the elongated loop 34 is draped about the dock cleat 16. However, instead of putting tension on the strap 10 to pull the open loop 34 against the cleat legs 17, the elongated loop end 36 is drawn through the dock cleat opening 19. The length of the elongated loop 34 is specially chosen to provide sufficient length to allow the elongated loop end 36 to be pulled adjacent the S-hook 28 where it is hooked by the S-hook receiving hook 30 and retained therein by the closing member 32.

When so hooked the elongated loop 34 completes a dock cleat 16 attachment such that each dock cleat leg 17 is independently looped. This creates a larger amount of strap-to-cleat leg 17 surface area contact thus decreasing the tendency of the strap 10 to slip about the legs 17. The completed loop about each leg 17 is also much smaller in circumference than a single cleat-encompassing loop, and the smaller circumferences reduce the effect of any slack in the overall strap 10. Such slack would be directly reflected in a single loop about the entire dock cleat 16 as is the prior art case.

Furthermore, when the second strap portion elongated loop 48 has been similarly, and previously, attached to the boat cleat 12, the attachment to the cleat 12 cannot come loose while the first strap portion elongated loop 34 is being positioned about, and threaded through, the dock cleat 16 and its opening 19. Thus movement of the boat 11 during the second attachment exercise cannot cause the loop 48 to escape the boat cleat 12. Similarly, both the dock cleat 16 and boat cleat 12 attachments are at no risk of dislodging while the user is tensioning the strap 10 using the tensioning mechanism 24.

An additional advantage of the double loop-to-cleat attachment method is that the elongated loop 34,48 cannot disengage from the dock cleat 16 or boat cleat 12 during extended storage. In the event of a storm or the like causing one of the four straps 10 in FIG. 1 to separate, then the remaining double loop-to-cleat attachments would continue to hold even without tension in their associated straps 10.

Figure 5:
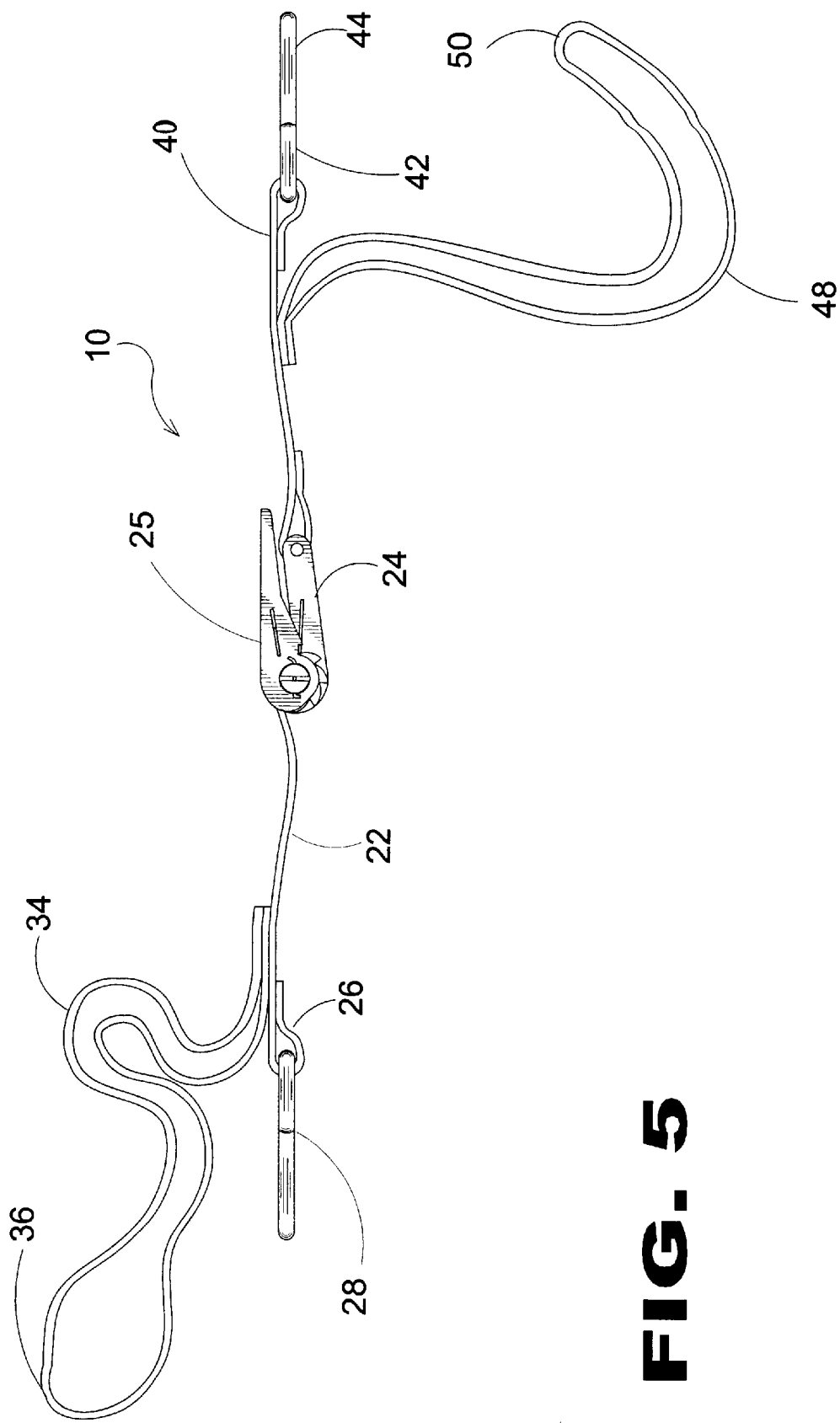
FIG. 5 is a side view of the present invention having a ratcheting tensioning mechanism and S-hook clasping elements.
Figure 6:
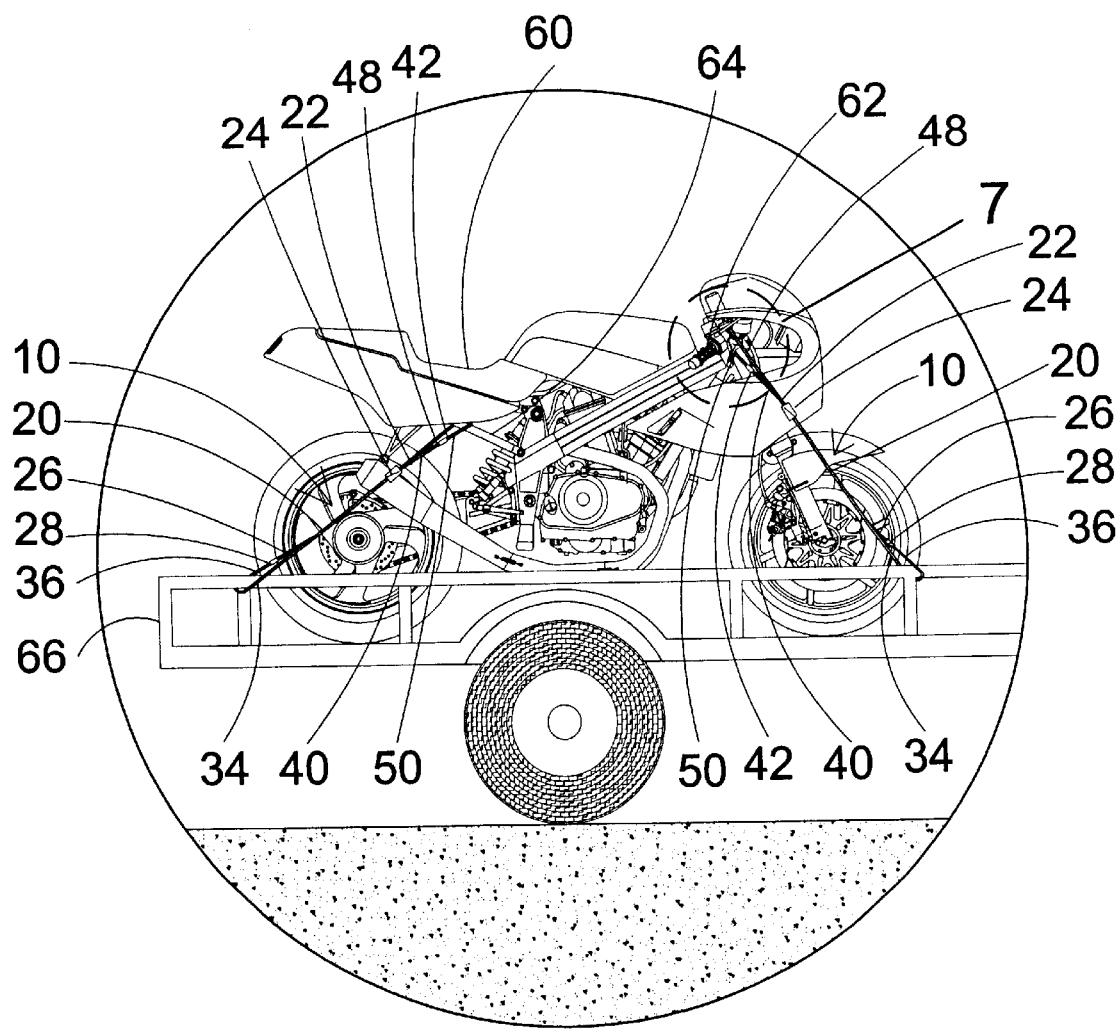
FIG. 6 is a front view of the present invention in use tying a motorcycle to a trailer for transport. The elongated loops keep the clasping elements from making contact with the components of the motorcycle and prevent any scratching and denting that might otherwise occur.
Figure 7:
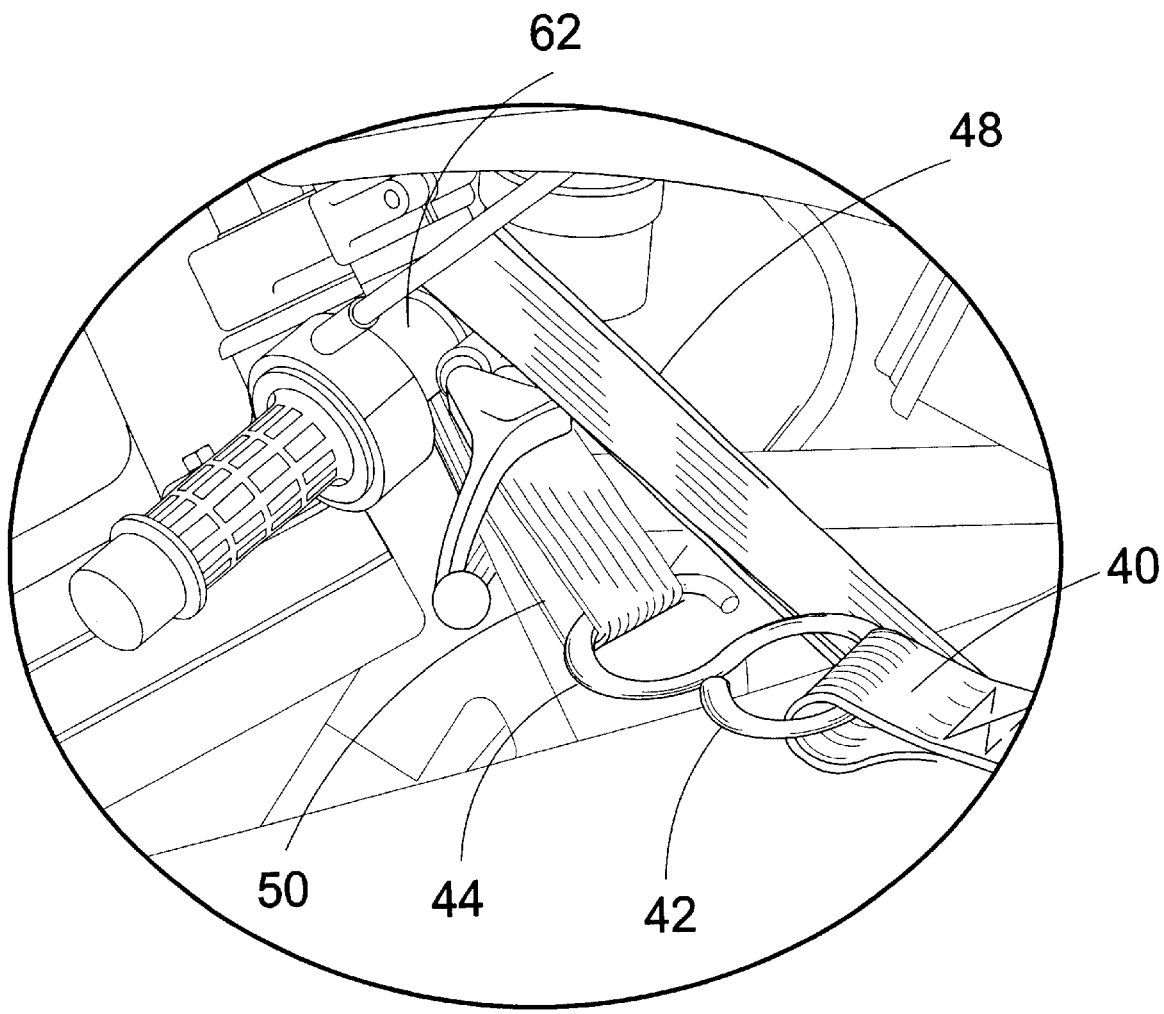
FIG. 7 is an enlarged perspective view of the present invention in use securing a motorcycle in place by looping the elongated attachment loop around the handlebar and then securing the loop end with the clasping element to the short loop.

FIG. 5 depicts the uniform lay of the strap portions 20,22, loops 26,34,40,48 and S-hooks 28,42, in the side view. While providing the means for the above-described double loop-to-cleat attachment, the strap 10 also presents a smooth, substantially planar strap configuration when attached to a single structural member at each end, such as in the motorcycle 60 application shown in FIGS. 6–7. In this application, the flattened second strap portion elongated loop 48 is wrapped about the handlebar 62 where it returns toward the short loop 40 to be secured by the second S-hook receiving hook 44. Similarly, a second strap 10 has its second strap portion elongated end 48 routed around a rear structural member 64 on the motorcycle 60 and routed back for attachment to another second S-hook receiving hook 44. Both straps 10 have their first elongated loop 34 routed around trailer rail 66 and then routed back to the S-hook receiving hook 30 on each such strap 10. The tensioning mechanism 24 is then used to tighten the straps 10 all around. The configuration of the straps 10 presents a continuous, substantially flat strap 10 over the entire length, avoiding the end hooks and other devices being against the motorcycle.

Figure 8:
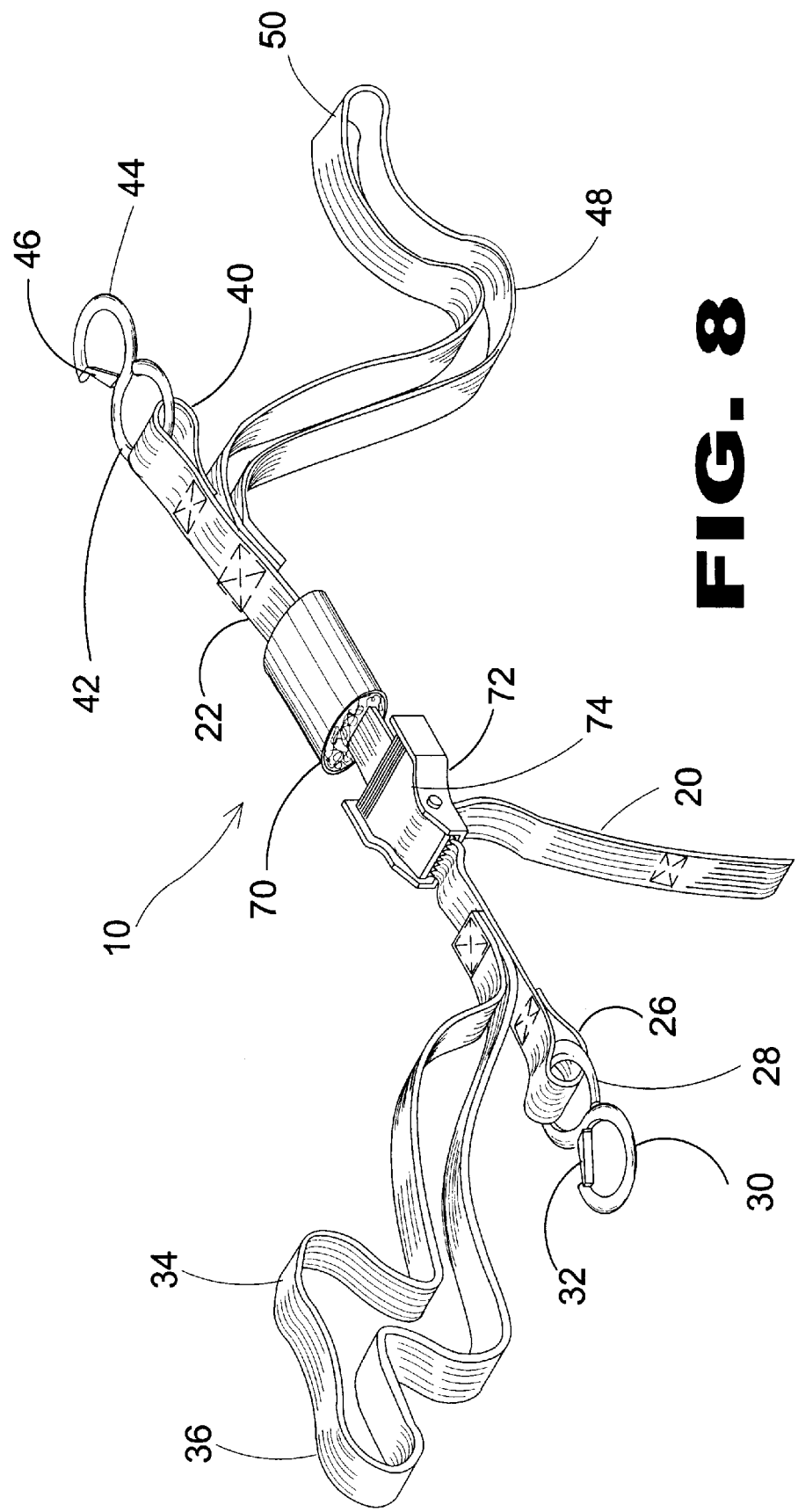
FIG. 8 is a perspective view of the present invention with a compression buckle as the tensioning means and S-hooks as the clasping means. A flotation device is also present to float the strap assembly.
Figure 9:
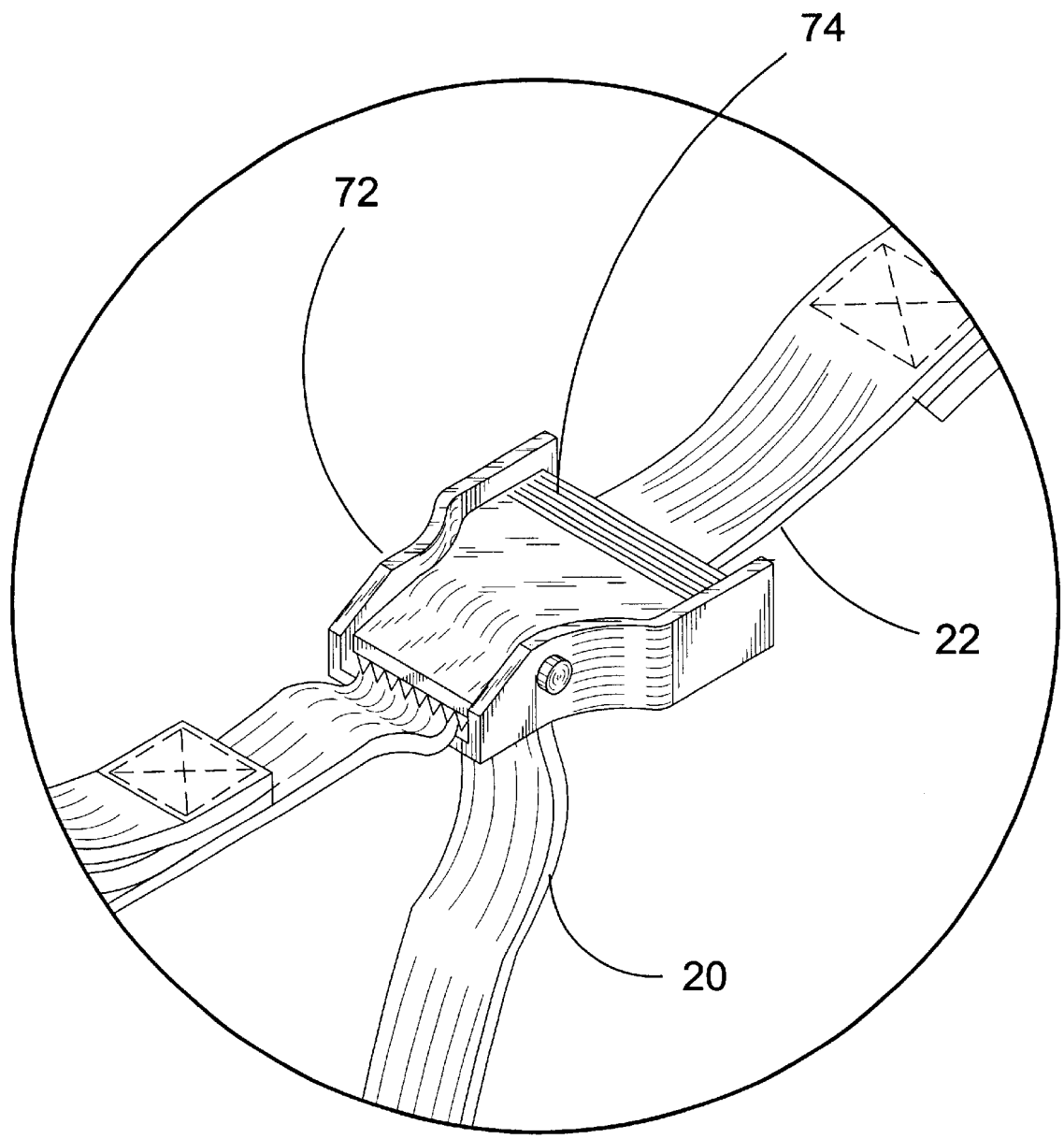
FIG. 9 is an enlarged perspective view of the compression buckle outfitted in such a way that adjustment of the length of the strap is controlled by releasing compression on the strap by pushing down on the compression buckle handle.

In another embodiment, depicted in FIGS. 8–9, a flotation device 70 is attached to the second strap portion 22, and the ratcheting-type tensioning mechanism 24 is replaced with a compression-type buckle 72, having a compression buckle release handle 74. In this embodiment, the first strap portion 20 extends through the buckle 72 as the length is adjusted. The flotation device 70 is sized to float the strap 10 in the event the strap 10 is inadvertently dropped overboard.

Figure 10:
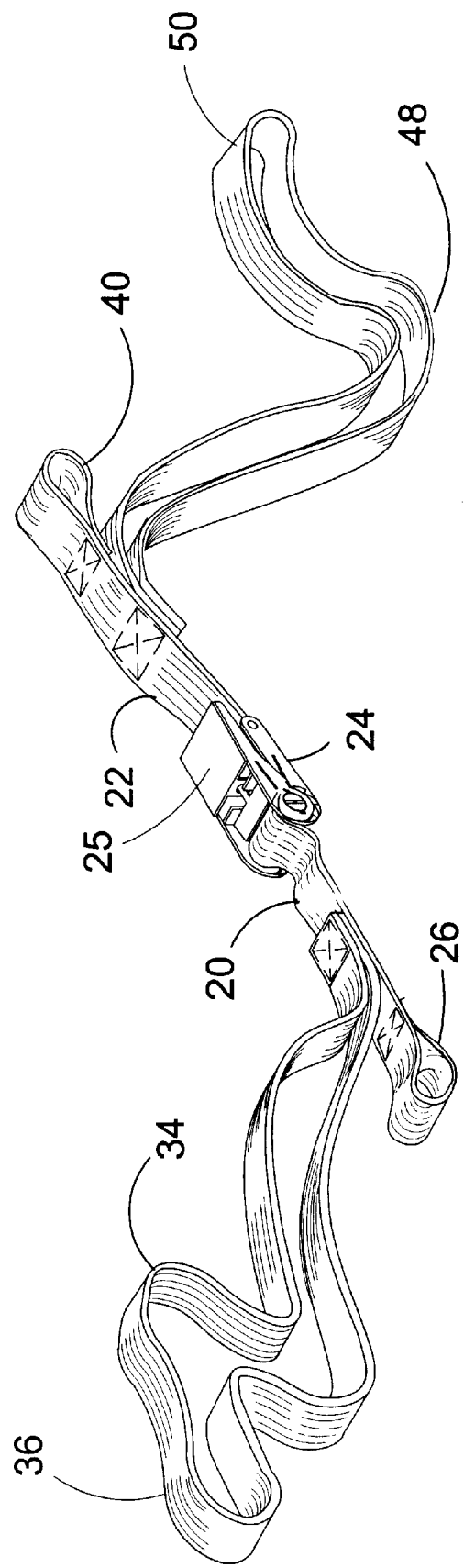
FIG. 10 is a perspective view of the present invention with a ratchet-style tensioning mechanism and the S-hooks removed for a single-post/pier application.

FIG. 10 depicts the strap 10 with the S-hooks 28,42 removed to allow a clean attachment of the long loops 34,48 to typical single-pole structures such as piers and freestanding posts.

Figure 11:
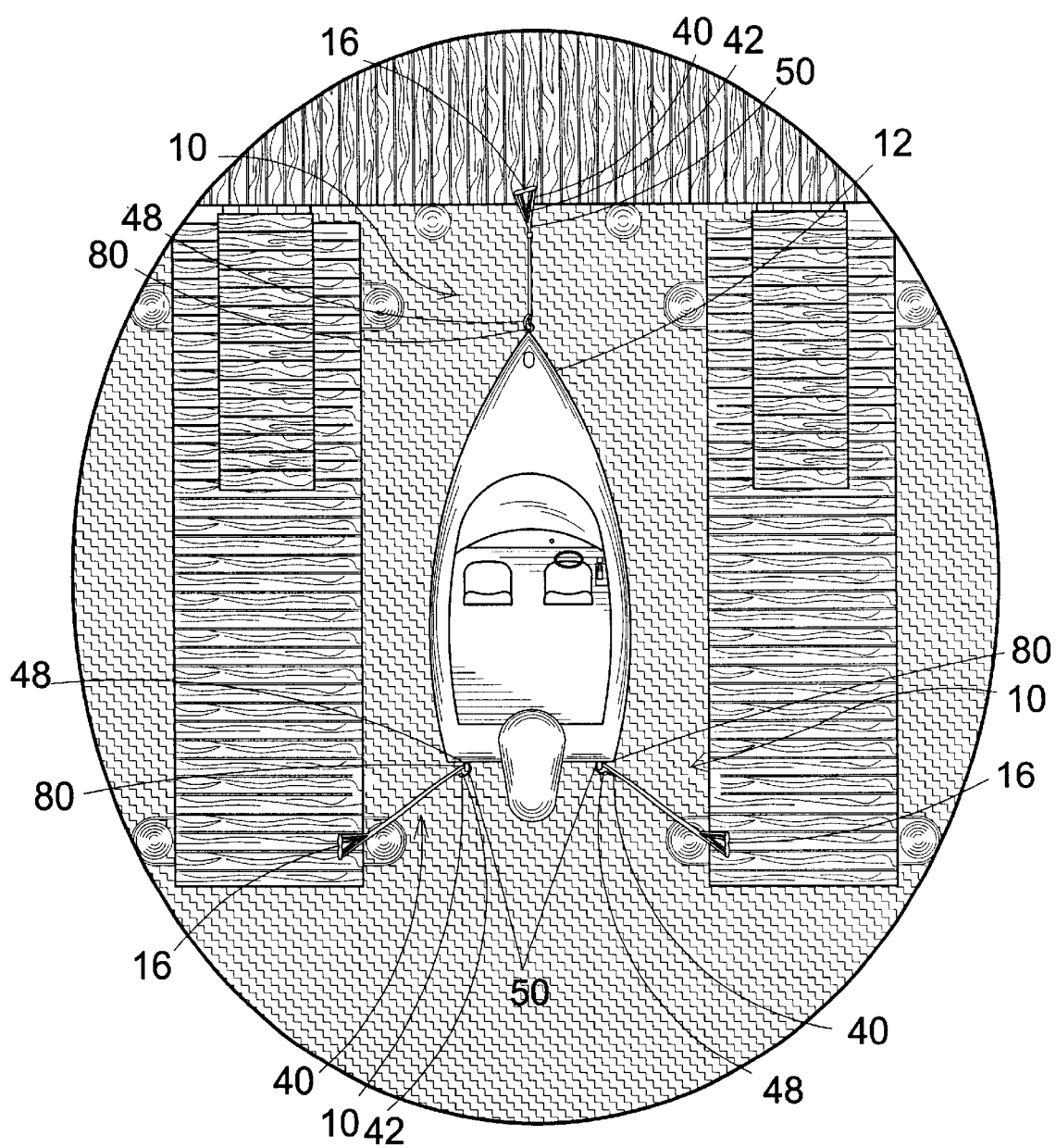
FIG. 11 is a perspective view of the present invention. The present invention is shown holding a boat secure using the boat's front and rear tie-rings and a flat configuration of the strap instead of the double loop-to-cleat configuration.

Because the strap 10 can be alternately used in the double-loop-to-cleat type configuration and in the flat configuration, it is readily adaptable when the boat 11 has a tie-ring 80 instead of a cleat 12, as shown in FIG. 11. In such a situation the flat configuration can be utilized at the boat tie-ring 80, while the double loop-to-cleat configuration is still used for the dock cleat 16.

Figure 12:
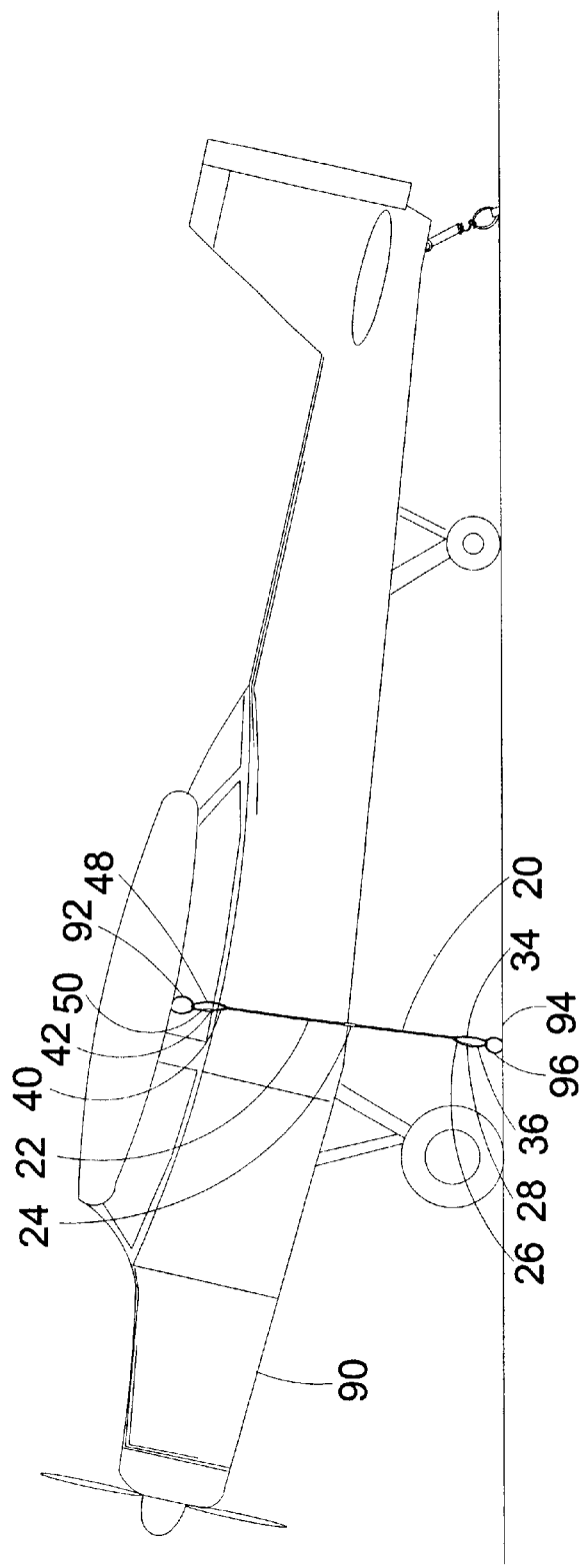
FIG. 12 is a perspective view of the present invention. The present invention is shown holding an aircraft secure to wing and ground surface tie-rings, using the flat configuration.

FIG. 12 depicts yet another application, wherein an aircraft 90 has tie-rings 92, while the airport ground surface 94 has tie-rings 96. In this application, the strap 10 is attached using the flat configuration at both ends.

With respect to the above description then, it is to be realized that the optimum material and dimensional relationships for the components of the straps 10, will include variations in size, materials, shape, and form, which will occur to those skilled in the art upon review of the present disclosure. For example the straps 10 can be constructed from various canvases, cords, plastics, and rubbers, and the tensioning mechanisms 24,72 and S-hooks 28,42 can be constructed from various metals and plastics, including stainless steel and the more rigid plastics. The strap width can also be adjusted for anticipated cleat and tie-ring sizes.

All equivalent relationships to those illustrated in the drawings and described in the specification are intended to be encompassed by the present invention.

What is claimed as new and desired to be protected by Letters Patent is set forth in the appended claims:

1. An apparatus for affixing a first object to a second object, the first object having a fastening receptacle and the second object having a fastening receptacle, comprising:

an elongated strap having a first portion and a second portion;

a length adjustment member, the first strap portion and the second strap portion extending from the length adjustment member, for alternately shortening and lengthening the combined length of the first and second strap portions;

the first strap portion further having a first loop at a free end of said first strap portion and an elongated, longer second loop extending from the first strap portion and beyond the first loop, said second loop being a fixed closed loop formed by a strap having both ends thereof attached together to said first strap portion, the extent to which the second loop extends beyond the first loop being large enough such that the elongated second loop can be routed to encompass the first object fastening receptacle and then routed back to the first loop;

a fastening member for securing the first loop to the second loop when the second loop is routed back to the first loop from the first object fastening receptacle; and the second strap portion having a distal portion, the distal portion being attachable to the second object fastening receptacle.

2. The apparatus of claim 1, wherein the second strap portion distal portion is a loop, the second strap portion further having an elongated, longer second loop extending from the second strap portion and beyond the second strap portion distal loop, said second strap portion second loop being a fixed closed loop formed by a strap having both ends thereof attached together and to said second strap portion, the extent to which the second strap portion second loop extends beyond the distal loop being large enough such that the elongated second strap portion second loop can be routed to encompass the second object fastening receptacle and then routed back to the distal loop, the apparatus further comprising a second fastening member for securing the distal loop to the second strap portion second loop when routed back to the distal loop from the second object fastening receptacle.

3. The apparatus of claim 2, wherein the second fastening member has a first closing hook for hooking and closing about the second strap portion distal loop, and a second closing hook for hooking and closing about the second strap portion second loop.

4. The apparatus of claim 1, wherein the first object fastening receptacle is a cleat having two legs, a cross piece joining the two legs and, with the first object, forming a cleat opening between the legs, and further wherein the first strap portion second loop has a looped distal end looping the two cleat legs and passing through the cleat opening back to the first loop forming a loop around each of the two legs of said cleat.

5. The apparatus of claim 4, wherein the second object fastening receptacle is a cleat having two legs, a cross piece joining the two legs and, with the second object, forming a cleat opening between the legs, and further wherein the second strap portion second loop has a distal looped end looping the two cleat legs and passing through the cleat opening and fastened to the distal loop using the second fastening member.

6. The apparatus of claim 1, wherein the fastening member has a first closing hook for hooking and closing about the first loop, and a second closing hook for hooking and closing about the second loop.

7. The apparatus of claim 1, wherein the length adjustment member is ratchetable.

8. The apparatus of claim 1, wherein the apparatus further comprises a flotation member, the flotation member being sized such that the apparatus will float.

9. The apparatus of claim 8, wherein the flotation member is attached to the second strap portion.

10. The apparatus of claim 8, wherein the flotation member is attachable to either the first or second strap portions.

11. The apparatus of claim 1, wherein the length adjustment member is a compression buckle attached to the second strap member, the first strap portion adjustably extending through the compression buckle.

12. The apparatus of claim 1, wherein the fastening member is an S-hook.

13. The apparatus of claim 12, wherein the second fastening member is an S-hook.

14. The apparatus of claim 1, wherein the first and second strap portions are separate portions joined by the length adjustment member.

15. Adjustable strap apparatus comprising:

an elongated strap having a first portion and a second portion;

length adjusting means connecting said first and second portions strap together and for adjusting the combined length of the first strap portion and the second strap portion;

the first strap portion further having a first loop and an elongated, longer second loop extending from the first strap portion and beyond the first loop, the second loop being a fixed closed loop formed by a strap having both ends thereof attached together and to said first strap portion;

fastening means for securing the first loop to the second loop; and the second strap portion having a distal portion, the distal portion being attachable to a fastening receptacle.

16. An apparatus for affixing a first object to a second object, the first object having a fastening receptacle and the second object having a fastening receptacle, comprising:

an elongated strap having a first portion and a second portion;

a length adjustment member, the first strap portion and the second strap portion extending from the length adjustment member, for alternately shortening and lengthening the combined length of the first and second strap portions;

the first strap portion further having a first loop and an elongated, longer second loop extending from the first strap portion and beyond the first loop, said second loop being formed by a strap having both ends thereof attached together and to said first strap portion forming a fixed closed loop between said both ends from said first strap portion, the extent to which the second loop extends beyond the first loop being large enough such that the elongated second loop can be routed to encompass the first object fastening receptacle and then routed back to the first loop;

a fastening member for securing the first loop to the second loop when the second loop is routed back to the first loop from the first object fastening receptacle; and the second strap portion having a first loop and an elongated, longer second loop extending from the second strap portion and beyond the second strap portion first loop, the extent to which the second loop extends beyond the first loop being large enough such that the elongated second loop can be routed to encompass the second object fastening receptacle and then routed back to the first loop, the apparatus further comprising a second fastening member for securing the first loop to the second strap portion second loop when the second loop is routed back to the first loop from the second object fastening receptacle.

17. The apparatus of claim 16, wherein the first object fastening receptacle is a cleat having two legs, a cross piece joining the two legs and, with the first object, forming a cleat opening between the legs, and further wherein the second loop has a distal end and a length such that the second loop can be placed to loop the two cleat legs and the second loop distal end can then be drawn through the cleat opening as the second loop distal end is routed back to the first loop, wherein it is fastenable to the first loop.

18. The apparatus of claim 17, wherein the second object fastening receptacle is a cleat having two legs, a cross piece joining the two legs and, with the second object, forming a cleat opening between the legs, and further wherein the second strap portion second loop has a distal end and a length such that the second loop can be placed to loop the two cleat legs and the second loop distal end can then be drawn through the cleat opening as the second loop distal end is routed back to the second strap portion first loop, wherein it is fastenable to the first loop using the second fastening member.

* * * * *